United States Patent

McIlroy et al.

[11] Patent Number: 5,820,830
[45] Date of Patent: Oct. 13, 1998

[54] WASTE RECOVERY AND UTILIZATION IN THE KRAFT RECOVERY PROCESS

[75] Inventors: Robert A. McIlroy, Marlboro Township; William Downs, Washington Township; Daniel R. Rowley, Alliance; Karl H. Schulze, North Canton; Dennis W. Johnson, Barberton; Jean Czuczwa, Silver Lake, all of Ohio

[73] Assignee: The Babcock & Wilcox Company, New Orleans, La.

[21] Appl. No.: 838,767

[22] Filed: Apr. 10, 1997

Related U.S. Application Data

[63] Continuation of Ser. No. 346,956, Nov. 30, 1994, abandoned.

[51] Int. Cl.⁶ .................................................. B01D 50/00
[52] U.S. Cl. ......................... 422/168; 162/30.11; 162/36; 162/51; 162/62; 162/375; 162/381; 162/DIG. 2; 422/173; 422/185
[58] Field of Search ..................................... 422/168, 173, 422/185; 162/30.11, 36, 51, 62, 375, 381, DIG. 2

[56] References Cited

U.S. PATENT DOCUMENTS

| 4,487,139 | 12/1984 | Warner | 110/345 |
| 4,557,202 | 12/1985 | Warner | 110/216 |
| 4,705,101 | 11/1987 | Warner | 165/104.31 |

FOREIGN PATENT DOCUMENTS

540997  5/1957  Canada ..................................... 162/36

OTHER PUBLICATIONS

Johnson, Rowley & Schulze, Babcock & Wilcox and Carrigan, Condensing Heat Exchanger Corporation. The Babcock & Wilcox Company Technical Paper No. RDTPA 94–29, Integrated Flue Gas Treatment and Heat Recovery Using a Condensing Heat Exchanger. Presented at the 1994 American Power Conference, Apr. 25–27, 1994. Entire paper.

Reprint of article "Utility seeks to integrate heat recovery, flue-gas treatment", compiled by Collins from *POWER* magazine, May, 1993. Entire paper.

Brochure, "White Paper, Consending Heat Exchanger Technology", Copyright ©1993, The Babcock & Wilcox Company. Entire paper.

*Steam: its generation and use*, 40th Edition, copyright ©1992, The Babcock & Wilcox Company, Chapter 26.

*Primary Examiner*—Timothy McMahon
*Attorney, Agent, or Firm*—R. J. Edwards; Eric Marich

[57] ABSTRACT

An integrated flue gas treatment and condensing heat exchanger is used to scrub sulfur dioxide from the flue gas produced by a power boiler used in a paper mill operating a kraft process. Sensible and latent heat from the flue gas is recovered and the condensate effluent from the condensing heat exchanger contains valuable chemicals that are returned to and used in the kraft process.

8 Claims, 4 Drawing Sheets

WASTE RECOVERY AND UTILIZATION IN THE KRAFT RECOVERY PROCESS

This is a continuation of application Ser. No. 08/346,956 filed Nov. 30, 1994 now abandoned.

FIELD AND BACKGROUND OF THE INVENTION

The present invention relates to the recovery and use of the sulfur and waste heat normally released from an oil-fired power boiler in a kraft recovery pulp mill.

As discussed in Chapter 26—Chemical and Heat Recovery in the Paper Industry of *Steam: its generation and use*, 40th Edition, Copyright ©1992 by The Babcock & Wilcox Company, the pulp and paper industry is the fourth largest industrial consumer of energy, and the third largest in energy purchases. The industry is the leading cogenerator of electric power with a 1985 capacity of 7,000 MW. Approximately one-half of the steam and power consumed by this industry is generated from fuels that are byproducts of the pulping process. The main source of self-generated fuel is the spent pulping liquor, followed by wood and bark. The energy required to produce pulp and paper products has been significantly reduced. Tremendous progress has also been made in reducing air emissions.

The heat value of the spent pulping liquor solids is a reliable fuel source for producing steam for power generation and process use. A large portion of the steam required for the pulp mills is produced in highly specialized heat and chemical recovery boilers. The balance of the steam demand is supplied by boilers designed to burn, coal, oil, gas and biomass.

The dominant North America pulping process is the sulfate process, deriving its name from the use of sodium sulfate ($Na_2SO_4$) as make-up chemical. The paper produced from this process was originally so strong in comparison with alternative processes that it was given the name kraft, which is the Swedish and German translation for strong. Kraft is an alkaline pulping process, as is the soda process which derives its name from the use of sodium carbonate, $Na_2CO_3$ (soda ash), as make-up chemical. The soda process has limited use in the U.S. and is more prominent in countries pulping non-wood fiber. Recovery of chemicals and the production of steam from waste liquor are well established in the kraft and soda processes. The soda process accounts for less than 1% of alkaline pulping production and its importance is now largely historic.

Power boilers in the pulp and paper industry are planned to be regulated under the Clean Air Act Amendment (CAAA) of 1990. The American Forest and Paper Association (AF&PA) describes the just-proposed "cluster" rules for the paper industry which cover both air and water discharges "As likely to become the costliest rules EPA has ever promulgated for a single industry. The proposal would effect about 350 pulp and paper mills, and is designed in part to reduce VOC emissions by 800,000 tpy (to a little more than 100,000 tpy), sulfur by 50,000 tpy (to about 290,000 tpy), and hazardous air pollutants by more than 100,000 tpy (to 50,000 tpy) . . . ".

Accordingly, a system which would allow the pulp and paper industry to meet these stricter environmental regulations, increase the energy efficiency of the pulp paper process, and recover waste materials that would otherwise be released into the atmosphere, while producing an effluent that can be used in the pulping process, would be welcomed by the pulp and paper industry.

A condensing heat exchanger, as shown in FIG. 1, recovers both sensible and latent heat from flue gas in a single unit. The preferred arrangement is for the gas from a stack tap-in 10, to pass down through a heat exchanger 12 while water passes upwardly in a serpentine path through the heat exchanger tubes therein, from a cold water inlet 14, to a hot water manifold outlet 16. Condensation occurs within the heat exchanger 12 as the gas temperature at the tube surface is brought below the dew point. The condensate falls as a constant rain over the tube array and is removed at the bottom, at an outlet plenum transition 18. Gas cleaning can occur within the heat exchanger 12 as the particulates impact the tubes and vapor condensation occurs.

The heat exchanger tubes and inside surfaces of the heat exchanger shell are made of corrosion resistant material or are covered with a fluoroplastic material such as Teflon® (Teflon® is a registered trademark of E.I. duPont de Nemours & Co., Inc.) or any similar tetrafluorethylene (TFE) fluoroplastic or fluorinated ethylene propylene (FEP) plastic material to protect them from corrosion when the flue gas temperature is brought below the sulfuric acid dew point. Interconnections between the heat exchanger tubes are made outside the tube sheet and are thus not exposed to the corrosive flue gas stream.

Also shown in FIG. 1 is a stack 20 from which the flue gas can be tapped as well as an induced draft fan 22, driven by a fan motor 24, and having an inlet box 26 which receives flue gas from the stack tap-in 10 and supplies it to a fan discharge transition duct 28, ending at the top of the heat exchanger 12. Conventional elements also provided are an inspection opening 30 and wash piping 32. Gases from the heat exchanger 12 pass through the outlet 18, which may also include an inspection opening 34 as well as a condensate drain 36, to the bottom of an FRP (fiberglass reinforced plastic) exhaust stack 40 mounted on stack support steel 42 which in turn is supported along with the other hardware on a steel base or skid 44. A pre-wired control panel 46 is generally included as a part of the heat exchanger system.

The amount of flue gas brought to the heat exchanger is regulated by a gas flow control damper 48 which has a damper positioner 50 controlled by control panel 46. Heat exchanger 12 comprises a plurality of stacked Teflon®-coated heat exchanger modules.

An integrated flue gas treatment (IFGT) condensing heat exchanger assembly, shown schematically in FIG. 2, is a condensing heat exchanger designed to enhance the removal of pollutants from a flue gas stream provided at 52, for example. It is also made of corrosion resistant material or has all of the inside surfaces covered with Teflon®.

There are four major sections of the IFGT; a first heat exchanger stage 54, an interstage transition region 56, a second heat exchanger stage 58, and a mist eliminator 60. The major differences between the integrated flue gas treatment design and the conventional condensing heat exchanger design are:

1) the integrated flue gas treatment design uses two heat exchanger stages 54 and 58, instead of one;
2) the interstage transition region 56, located between the two heat exchanger stages, is used to direct the flue gas to the second heat exchanger stage 58, acts as a collection tank for condensate effluent at 62, 64 and allows treatment of the flue gas between the stages by drawing fluid at 62, 63 to an alkali reagent or water spray system 65 including tank 66 and returning it by means of a pump 68 and nozzle 69;
3) the flue gas flow in the second heat exchanger stage 58 is upward, rather than downward;

4) the second heat exchanger stage 58 is connected to the alkali reagent spray system 65 by line 70 and nozzle 74 from tank 66 of system 65 via pump 68; and 5) the mist eliminator 60 is used to separate the water formed by condensation and sprays from the flue gas just prior to outlet 72.

Most of the sensible heat is removed from the flue gas in the first heat exchanger stage 54 of the IFGT. The transition region 56 can be equipped with the water or alkali spray system 65. This system 65 saturates the flue gas with moisture before it enters the second heat exchanger stage 58 and also assists in removing sulfur pollutants, acid gases e.g. HCl, and other pollutants from the flue gas. The transition region 56 is made of corrosion resistant fiberglass-reinforced plastic. The second heat exchanger stage 58 is operated in the condensing mode, removing latent heat from the flue gas along with pollutants. The top of the second heat exchanger stage 58 is equipped with an alkali solution spray system nozzle at 74. The flue gas in this stage is flowing upwardly while the droplets fall downwardly. This counter current gas/droplet flow provides a scrubbing mechanism that enhances particulate and pollutant capture. The condensed vapors, particulates, and reacted alkali solution are collected at the bottom of the transition region 56. The flue gas outlet of the IFGT is also equipped with a mist eliminator 60 to reduce the chance of moisture carryover.

An exhaust gas treatment method and apparatus is disclosed in U.S. Pat. No. 4,557,202. Also, see U.S. Pat. No. 4,487,139. U.S. Pat. No. 4,705,101 discloses a flue gas reheat apparatus, while U.S. Pat. No. 5,368,096 discloses an improved condensing heat exchanger scrubber system.

SUMMARY OF THE INVENTION

According to the present invention, an integrated flue gas treatment (IFGT) condensing heat exchanger is used to scrub the sulfur dioxide from the flue gas while recovering both sensible and latent heat from the gas. The condensate effluent from the IFGT is sent to the pulp mill black liquor system as a source of make-up sulfur while the recovered waste heat can be used to heat make-up water or for other low-level heating needs. The heat exchanger tubes and the inside surfaces of the IFGT are covered with Teflon® to protect them against acid corrosion when the flue gas temperature drops below its dew point.

A power boiler is a key part of the total energy system for a kraft recovery pulp and paper mill. It supplements the steam production from the recovery boiler to meet the total steam demand of the mill. Any improvement in the power boiler efficiency will also result in improving the overall energy balance of the pulp mill.

The efficiency of the power boiler can be significantly increased by decreasing the exit flue gas temperature. One means of lowering the exit gas temperature is to use a condensing heat exchanger to recover latent heat as well as sensible heat from the flue gas. Commercial condensing heat exchanger units have demonstrated satisfactory performance in over one hundred industrial applications over the past ten years. The use of Teflon® coatings on all portions of the heat exchanger exposed to the condensing gas ensure adequate material lifetime in the corrosive environment encountered when the flue gas temperature drops below the acid dew point.

When a commercial condensing heat exchanger is used with a high sulfur fuel oil, some of the sulfur in the fuel that has been converted to sulfur trioxide ($SO_3$) will be collected in the condensate. The effluent from the condensing heat exchanger will be a dilute sulfuric acid solution which presents a disposal problem. Also, current commercial condensing heat exchanger designs are not effective for removing sulfur dioxide from the flue gas.

Accordingly, one aspect of the present invention is drawn to an integrated flue gas treatment arrangement for extracting sulfur from the flue gas produced by a power boiler used in connection with a pulp mill, for supplying the sulfur to the pulp mill and for utilizing heat from the flue gas. Thus, rather than facing a disposal problem for sulfuric acid waste, the present invention puts the sulfur and sulfur compounds to good use in the pulp mill.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

DESCRIPTION OF THE PREFERRED EMBODIMENT

Figure 1:
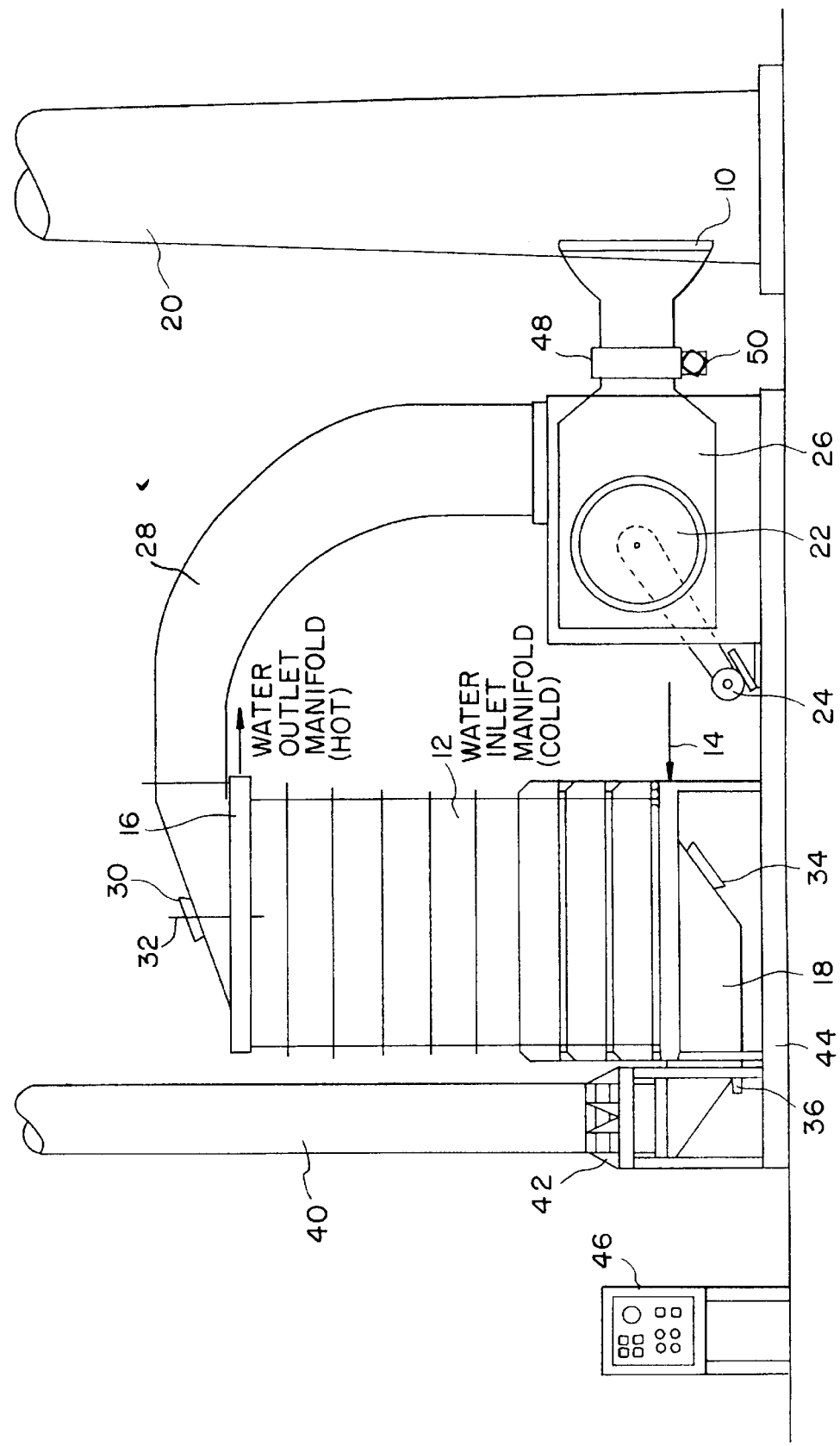
FIG. 1 is a schematic representation of a known condensing heat exchanger system.
Figure 2:
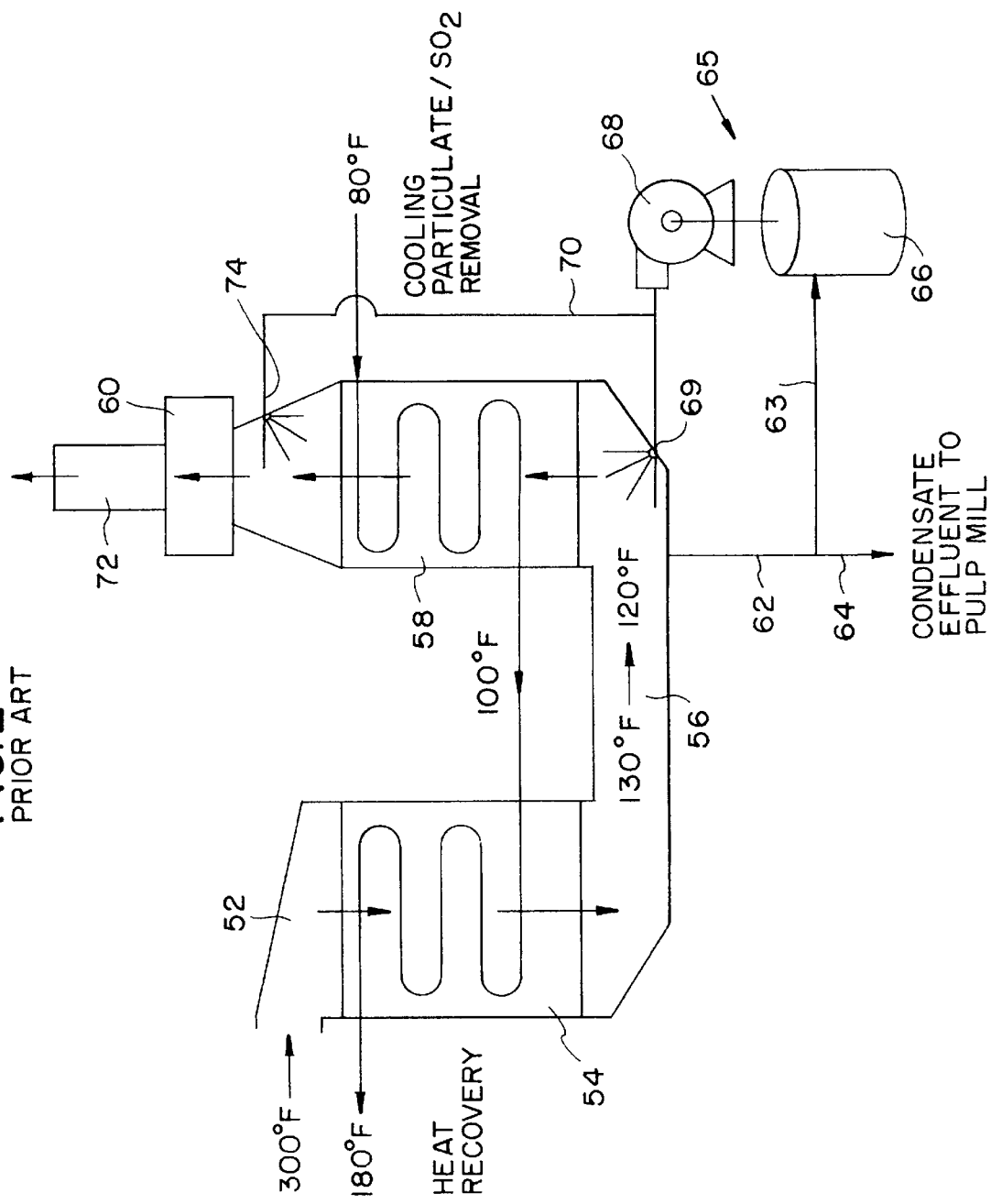
FIG. 2 is a schematic representation of a known integrated flue gas treatment system.
Figure 3:
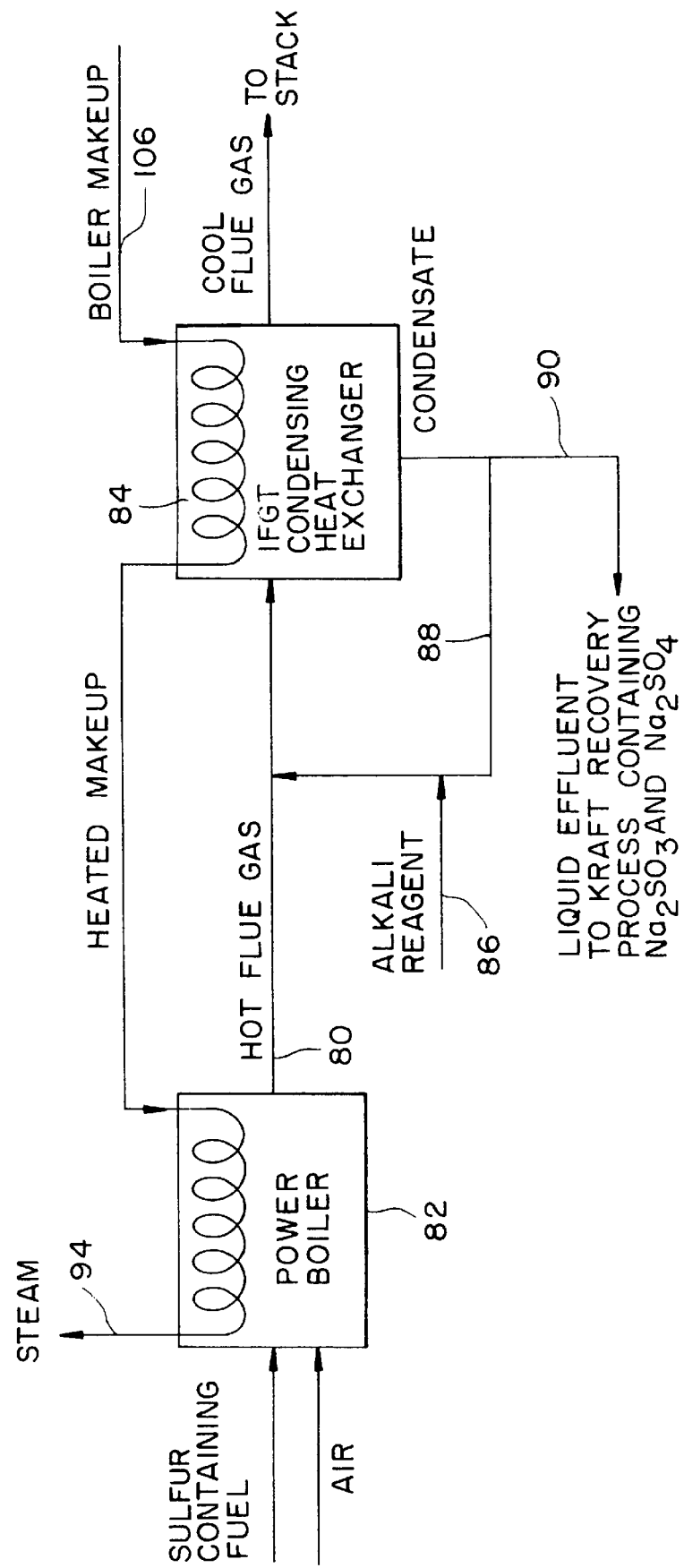
FIG. 3 is a schematic view of the waste minimization and recovery process of the present invention.

In the following discussion, like numerals designate the same or functionally similar elements throughout the several drawings. The present invention relates to the application of an integrated flue gas treatment (IFGT) system to a pulp mill having at least one boiler which produces hot flue gas containing at least one sulfur compound. A complete discussion of the various features of the kraft pulping and recovery process is beyond the scope of the present invention but the reader may refer as necessary to the aforementioned Chapter 26—Chemical and Heat Recovery in the Paper Industry, of *Steam: its generation and use,* 40th Edition, pages 26-1 through 26-21, a copy of which accompanies the present application, and the text of this section is hereby incorporated by reference as though fully set forth herein. Referring now to the drawings, the waste reduction and utilization process and apparatus of the invention is shown schematically in FIG. 3. The sulfur that is normally emitted as a pollutant in the hot flue gas at 80 from a power boiler 82, is recovered by an IFGT condensing heat exchanger 84 and is reused in the pulp mill. This IFGT condensing heat exchanger 84 also removes waste heat from the flue gas for use elsewhere in the pulp mill.

The IFGT condensing heat exchanger 84 of the invention scrubs the flue gas with an alkali reagent introduced at 86 into a condensate recycle loop 88, to increase sulfur removal efficiency. Instead of using a calcium-based slurry as the alkali reagent, which results in an effluent sludge stream that must be sent to a landfill, the invention uses a sodium-based solution such as sodium hydroxide (NaOH), although sodium carbonate, sodium bicarbonate, or sodium sulfite could be used. Alternatively, the mill might purchase bulk soda ash which could be disolved external to this system to produce the solution.

Figure 4:
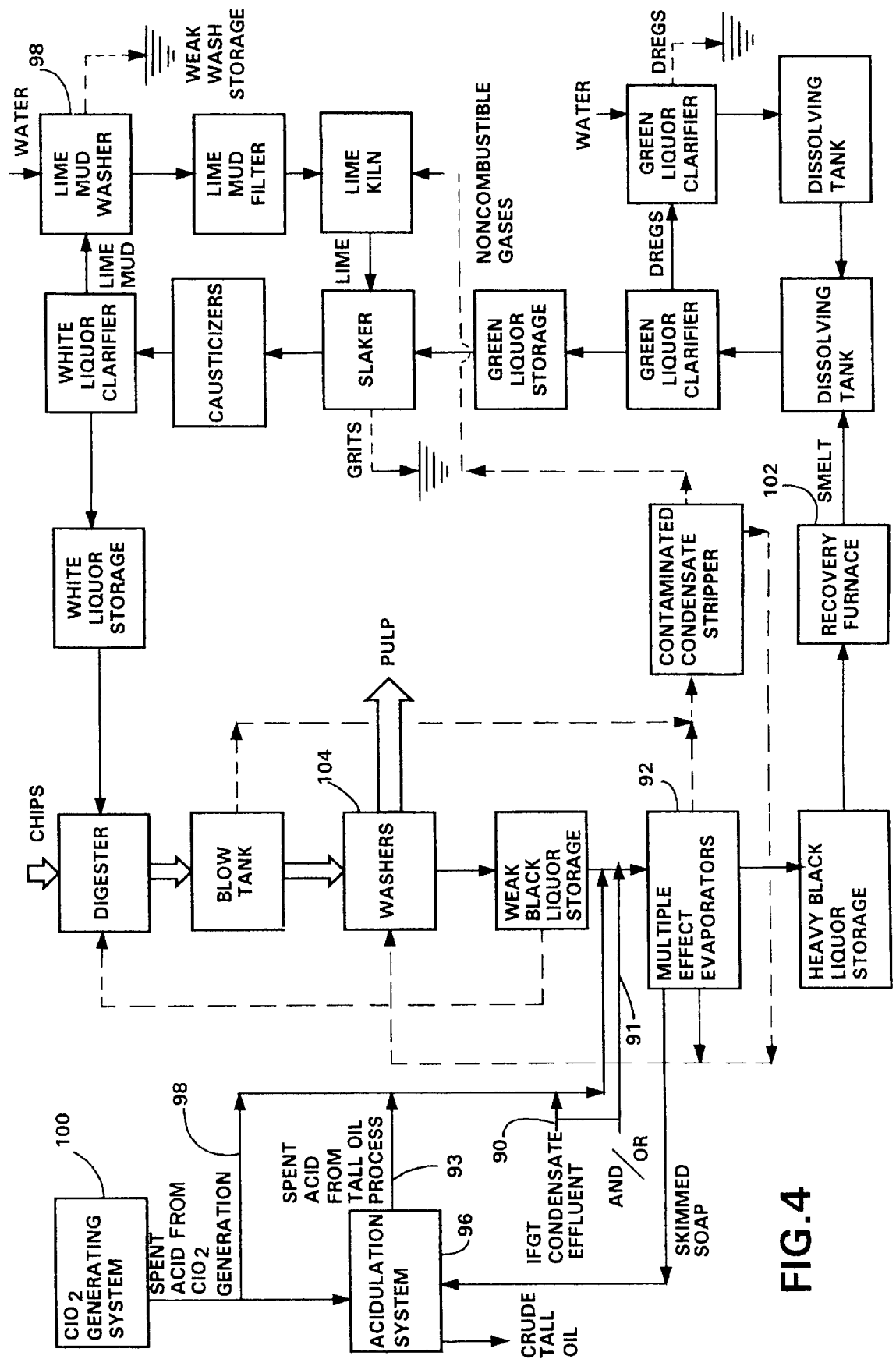
FIG. 4 is a flow chart showing a typical kraft process used in conjunction with the present invention.

The NaOH alkali reagent is readily available in most pulp mills since it is used as a pulping chemical, and is added at 86 to the recirculating stream of condensate 88. The ratio of NaOH to $SO_2$ can be adjusted to optimize the sulfur removal performance. Under these conditions, the effluent stream from the IFGT condensing heat exchanger 84 is a solution of sodium sulfite ($Na_2SO_3$) and sodium sulfate ($Na_2SO_4$). The effluent stream 90 from the IFGT 84 is sent to the pulp mill black liquor system as a source of make-up sulfur. FIG. 4 illustrates the kraft process, and the various points of IFGT condensate effluent 90 introduction.

The condensate effluent 90 replaces some of the sodium sulfate or "salt cake" that the mill normally would purchase as a make up chemical. There are several points where this recovered stream can be added to the recovery process, depending upon the dissolved salt concentration.

The simplest point is at the inlet 91 to a multiple effect evaporator at 92 as shown in FIG. 4, so that the water is evaporated during the liquor concentration.

If a more concentrated solution with a relatively high pH is produced, it could be mixed with the spent acid 93 from the tall oil acidulation system 96 or with the chlorine dioxide generator effluent 98 from chlorine dioxide generating system 100, before these streams are added to the black liquor. Alternatively, the effluent stream 90 could also be added to the heavy liquor (after the multiple effect evaporators 92) but this is a less desirable location due to dilution of the liquor and the danger of liquor precipitation.

Other parts of the kraft process are shown in FIG. 4.

The inventive process provides an economical and environmentally attractive method to remove sulfur oxides from the flue gas, reuse the sodium and sulfur in the pulping process, and increase the useable heat output of the power boiler. Additional cost savings may eventually be realized by converting the power boiler to lower cost high-sulfur fuels, since the process will recover the sulfur and use it in the pulp mill.

Other advantages of the invention are outlined as follows:

Energy Savings

The invention can be applied to a No. 6 fuel oil-fired power boiler in a kraft pulp and paper mill. The steam 94 from the power boiler at 82 in FIG. 3, supplements steam from black liquor recovery furnace or boiler at 102 in FIG. 4, to satisfy the total pulp mill steam demand.

The quantity of supplemental steam required per ton of paper produced is influenced by many factors beyond the control of the power boiler operator. For example, an increase in the efficiency of the brown stock washer 104 will return more solids to the recovery boiler 102, which increases its steam output and reduces the output required from the power boiler 82 for the same overall steam demand. The energy savings of the inventive system can thus be considered in terms of fuel oil savings for a constant rate of steam production.

For a typical oil-fired power boiler 82 in a paper mill of 130,000 lb/hr steam capacity, the heat input to the boiler is 186 million Btu per hour with a flue gas temperature at the economizer exit of 330° F. The application of the IFGT condensing heat exchanger 84 will further cool the gas to approximately 120° F. or lower. The heat recovered in the IFGT is 9.3 million Btu/hr when the flue gas is cooled to 120° F. This heat can be used to preheat make-up water supplied at 106 to the mill which is typically preheated by direct injection of steam. This reduced steam demand is equivalent to 10.8 million Btu/hr.

Waste Reduction

The invention recovers sulfur in a usable form. It is anticipated that regulations governing sulfur dioxide ($SO_2$) emissions from fossil fuel-fired boilers in paper mills will require some form of $SO_2$ control in the near future. The most widely used current control system for $SO_2$ removal on large boilers is the limestone wet scrubber system with forced oxidation. In this process, the $SO_2$ is converted to calcium sulfate dihydrate ($CaSO_4 \bullet 2H_2O$) which is discharged from the process as a 50–90% by weight cake. This cake is typically sent to a landfill. The waste cake from a 130,000 lb/hr steam oil-fired power boiler fueled with No. 6 oil containing 2% sulfur will amount to approximately 1990 lb/hr of 50% solids cake.

The invention will add, at 86, sodium hydroxide (NaOH), or possibly sodium carbonate ($Na_2CO_3$) or sodium bicarbonate ($NaHCO_3$) to the recirculated condensate stream 88. The $SO_2$ is absorbed and converted to a sodium sulfite ($Na_2SO_3$) solution with some sodium sulfate ($Na_2SO_4$). The oxidation will not be complete because of the limited oxygen in the flue gas. The condensate effluent stream 90 containing the dissolved sodium salts will be sent to the recovery system as a source of make-up chemicals for the pulping process resulting in there being no waste stream from the process. Therefore, the total waste reduction for the process is equal to the entire sludge stream from the wet scrubber.

The pulp mill would normally purchase some sodium sulfate, commonly referred to as salt cake, as make-up for the sodium and sulfur lost in the pulping process. The condensate with dissolved sodium sulfite would replace a portion of this $Na_2SO_4$. There is a cost associated with buying sodium hydroxide, sodium carbonate, or sodium bicarbonate in place of sodium sulfate, but this is offset by the reduction in waste disposal costs.

The configuration of the IFGT condensing heat exchanger could be modified to include additional heat exchanger stages, alternate materials of construction (e.g. glass, graphite, ceramic or corrosion-resistant alloys), or different spray location combinations, and still be within the inventive aspects of the present invention.

The same result could be accomplished by using a conventional condensing heat exchanger in combination with a separate $SO_2$ scrubber using solution scrubbing. This would be less attractive from a capital cost standpoint since a single IFGT unit would be replaced by two pieces of equipment.

Other potential alternatives to the invention include:

Using any sulfur containing fuel, not just No. 6 fuel oil, in the power boiler.

The IFGT unit may also be installed to receive the flue gas stream from the recovery boiler.

Heat recovery depends on the cycle and other needs of the plant. The IFGT can heat air, water, glycol, or other fluids directly or through closed loop heating. This could include many of the streams in the mill such as white liquor.

The IFGT could supplement the heat requirements of the evaporator or allow additional power and/or steam production.

The IFGT can remove $SO_3$, HCl, and other acid gases, particulate, condensible metals, organics, and other air toxics, in addition to $SO_2$.

While a specific embodiment of the invention has been shown and described in detail to illustrate the application of the principles of the invention, it will be understood that the invention may be embodied otherwise without departing from such principles.

We claim:

1. In combination with a kraft recovery pulp mill having at least one power boiler which produces hot flue gas containing at least one sulfur compound, a waste heat and sulfur recovery apparatus for extracting sulfur and heat from the flue gas produced by the power boiler for use in the pulp mill, comprising:

a corrosion-resistant condensing heat exchanger connected to the power boiler for receiving at least some of the flue gas from the power boiler, the condensing heat exchanger having surfaces exposed to condensing corrosive gases from the flue gas, an upper inlet and a lower outlet with a drain, a conduit connected between the power boiler and the upper inlet for supplying the flue gas to the condensing heat exchanger, and a recycle loop connected between the drain and the conduit for recirculating condensate and mixing it with the flue gas;

means for supplying an alkali sodium-based solution selected from the group consisting of sodium hydroxide, sodium carbonate, sodium bicarbonate, and sodium sulfite to the condensing heat exchanger for reacting same with the condensate to form a sulfur containing solution; and supply line means connected between the recycle loop and the pulp mill for supplying the sulfur containing solution to a multiple effect evaporator of the pulp mill so that water in the solution is evaporated during liquor concentration in the pulp mill.

2. The apparatus according to claim 1 wherein the corrosion-resistant condensing heat exchanger includes coating means on surfaces of the condensing heat exchanger for avoiding corrosion, the corrosion-resistant coating means comprising a fluoroplastic material.

3. The apparatus according to claim 2, wherein the corrosion-resistant coating means comprises one of a TFE and FEP material coating on the surfaces.

4. The apparatus according to claim 1 wherein the power boiler comprises an oil-fired power boiler.

5. The apparatus according to claim 1 wherein the power boiler comprises a sulfur-containing fuel burning power boiler.

6. The apparatus according to claim 1 wherein the power boiler utilizes make-up fluid, the apparatus including means for passing the make-up fluid through the condensing heat exchanger for heating the make-up fluid before it is supplied to the power boiler.

7. The apparatus according to claim 1, wherein the supply line supplies the sulfur containing solution to a spent acid stream from a tall oil system before both the solution and the spent acid are added to black liquor produced by the pulp mill.

8. The apparatus according to claim 1, wherein the supply line supplies the sulfur containing solution to effluent from a chlorine dioxide generator before both the solution and the effluent are added to black liquor produced by the pulp mill.

* * * * *